United States Patent
Muff et al.

(10) Patent No.: US 9,424,490 B2
(45) Date of Patent: Aug. 23, 2016

(54) SYSTEM AND METHOD FOR CLASSIFYING PIXELS

(71) Applicant: MICROSOFT TECHNOLOGY LICENSING, LLC, Redmond, WA (US)

(72) Inventors: Adam James Muff, Woodinville, WA (US); John Allen Tardif, Sammamish, WA (US); Susan Carrie, Mountain View, CA (US); Mark J. Finocchio, Redmond, WA (US); Kyungsuk David Lee, Bellevue, WA (US); Christopher Douglas Edmonds, Carnation, WA (US); Randy Crane, Windsor, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 208 days.

(21) Appl. No.: 14/318,135

(22) Filed: Jun. 27, 2014

(65) Prior Publication Data

US 2015/0379376 A1    Dec. 31, 2015

(51) Int. Cl.
*G06K 9/68* (2006.01)
*G06K 9/62* (2006.01)
*G06K 9/00* (2006.01)

(52) U.S. Cl.
CPC .......... *G06K 9/6267* (2013.01); *G06K 9/00973* (2013.01); *G06K 9/6282* (2013.01)

(58) Field of Classification Search
None
See application file for complete search history.

(56) References Cited

U.S. PATENT DOCUMENTS

| | | | | |
|---|---|---|---|---|
| 905,393 A * | 12/1908 | Webb | ................... | A01K 39/012 119/53 |
| 4,817,175 A * | 3/1989 | Tenenbaum | ............... | G06T 1/20 375/E7.093 |
| 5,007,100 A * | 4/1991 | D'Aoust | ................... | G06T 1/20 382/303 |
| 5,261,012 A * | 11/1993 | Hardy | ....................... | G06T 5/30 382/258 |
| 5,298,896 A * | 3/1994 | Lei | ....................... | H03M 7/4006 341/107 |
| 5,581,634 A | 12/1996 | Heide | | |
| 5,732,164 A * | 3/1998 | Kawaguchi | ............... | G06T 7/20 348/720 |
| 6,400,849 B1 * | 6/2002 | Lee | ........................... | G06T 5/20 382/260 |
| 6,915,480 B2 * | 7/2005 | Calle | ....................... | H04L 1/201 714/774 |
| 8,295,546 B2 * | 10/2012 | Craig | ................. | G06K 9/00369 382/103 |
| 8,655,070 B1 * | 2/2014 | Yang | ................... | G06K 9/00657 382/100 |

(Continued)

OTHER PUBLICATIONS

Random decision—FPGAS, Oberg et al., IEEE, 978-4673-2256-0, 2012, pp. 330-337.*

(Continued)

*Primary Examiner* — Jayesh A Patel
(74) *Attorney, Agent, or Firm* — Micah Goldsmith; Judy Yee; Micky Minhas

(57) ABSTRACT

Embodiments are disclosed that relate to processing image pixels. For example, one disclosed embodiment provides a system for classifying pixels comprising retrieval logic; a pixel storage allocation including a plurality of pixel slots, each pixel slot being associated individually with a pixel, where the retrieval logic is configured to cause the pixels to be allocated into the pixel slots in an input sequence; pipelined processing logic configured to output, for each of the pixels, classification information associated with the pixel; and scheduling logic configured to control dispatches from the pixel slots to the pipelined processing logic, where the scheduling logic and pipelined processing logic are configured to act in concert to generate the classification information for the pixels in an output sequence that differs from and is independent of the input sequence.

20 Claims, 6 Drawing Sheets

(56) References Cited

U.S. PATENT DOCUMENTS

| | | | |
|---|---|---|---|
| 2002/0176631 A1* | 11/2002 | Li | G06T 9/005 382/238 |
| 2006/0018562 A1* | 1/2006 | Ruggiero | G06F 9/3879 382/300 |
| 2006/0153475 A1* | 7/2006 | Ruggiero | H04N 7/012 382/276 |
| 2008/0317331 A1* | 12/2008 | Winn | G06F 3/017 382/154 |
| 2010/0197390 A1 | 8/2010 | Craig et al. | |
| 2010/0303289 A1 | 12/2010 | Polzin et al. | |
| 2011/0051003 A1* | 3/2011 | Zhou | G06T 7/2033 348/576 |
| 2011/0058709 A1 | 3/2011 | Kipman et al. | |
| 2011/0085705 A1 | 4/2011 | Izadi et al. | |
| 2011/0188715 A1* | 8/2011 | Shotton | G06K 9/00 382/128 |
| 2011/0228976 A1 | 9/2011 | Fitzgibbon et al. | |
| 2011/0307423 A1* | 12/2011 | Shotton | G06K 9/6282 706/12 |
| 2012/0309532 A1 | 12/2012 | Ambrus et al. | |
| 2013/0179377 A1 | 7/2013 | Oberg et al. | |
| 2013/0335318 A1 | 12/2013 | Nagel et al. | |

OTHER PUBLICATIONS

Sharp, T., "Implementing Decision Trees and Forests on a GPU", In Proceedings of 10th European Conference on Computer Vision, Computer Vision—ECCV 2008, Oct. 2008, 14 pages.

Criminisi, A. et al., "Decision Forests: A Unified Framework for Classification, Regression, Density Estimation, Manifold Learning and Semi-Supervised Learning", Foundations and Trends in Computer Graphics and Vision, vol. 7, No. 2-3, Jan. 2011, 150 Pages.

ISA European Patent Office, International Search Report and Written Opinion Issued in Application No. PCT/US2015/037307, Sep. 14, 2015, WIPO, 10 pages.

Andrews et al., "Xbox 360 System Architecture", IEEE Micro, 26 (2), Mar. 2006, pp. 25-37.

Jessel, David, "AMD Operton TM Processors: A Better High-End Embedded Solution", Mar. 2005, 7 pages.

Kinect User's Manual, Microsoft Corporation, Nov. 2010, 19 pages.

McGrath, "Kinect's BOM Rougly $56 Teardown Finds", EE Times, Nov. 11, 2010, 2 pages.

Narayanan et al., "An FPGA Implementation of Decision Tree Classification", Design, Automation & Test in Europe Conference & Exhibition, Apr. 16-20, 2007, 6 pages.

Odermatt, Roger. "Improving Action Classifiers with Depth", Retrieved at http://e-collection.library.ethz.ch/eserv/eth:5133/eth-5133-01.pdf, Swiss Federal Institute of Technology Zurich, Jul. 29, 2011, 37 pages.

Pogue, "Kinect Pushes Users Into a Sweaty New Dimension", NY Times, Nov. 4, 2010, 4 pages.

Shotton et al., "Real-Time Human Pose Recognition in Parts from Single Depth Images", Proceedings of the 24th IEEE Conference on Computer Vision and Pattern Recognition (CVPR), Jun. 20-25, 2011, 8 pages.

"The Teardown: The Kinect for Xbox 360", Engineering & Technology, Apr. 2011, pp. 94-95.

Shotton, et al, "Efficient Human Pose Estimation from Single Depth Images", In Proceedings of Decision Forests for Computer Vision and Medical Image Analysis, Jan. 2013, 21 pages.

Pittman, et al., "Image Segmentation Using Hardware Forest Classifiers", In Proceedings of the IEEE 21st Annual International Symposium on Field-Programmable Custom Computing Machines, Apr. 28, 2013, 8 pages.

Becker, et al., "Hardware-accelerated Object Tracking", In Proceedings of Computer Vision on Low-Power Reconfigurable Architectures Workshop, Field Programmable Logic and Applications (FPL), Sep. 4, 2011, 2 pages.

Oberg, et al., "Random decision tree body part recognition using FPGAs", In Proceedings of 22nd International Conference on Field Programmable Logic and Applications, Aug. 29, 2012, pp. 330-337.

Osman, Hassab Elgawi, "Random Forest-LNS Architecture and Vision", In IEEE International Conference on Industrial Informatics, Jun. 2009, pp. 319-324.

IPEA European Patent Office, Second Written Opinion issued in Application No. PCT/US2015/037307, Jun. 15, 2016, WIPO, 7 pages.

* cited by examiner

SYSTEM AND METHOD FOR CLASSIFYING PIXELS

BACKGROUND

A variety of methods exist for classifying pixels. One type of classification entails computing a statistical probability that a pixel has a certain feature or belongs to a certain class. In some classification systems, pixel data is "walked" through decision nodes of a decision tree, until processing operations culminate at a leaf node. Associated with the leaf node is an output that is used to classify the pixel. Typical decision tree systems have shallow pipelines and are sub-optimal in their handling of operation stalls, memory contention and long-latency events.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Embodiments are disclosed that relate to processing image pixels. For example, one disclosed embodiment provides a system for classifying pixels comprising retrieval logic; a pixel storage allocation including a plurality of pixel slots, each pixel slot being associated individually with a pixel, where the retrieval logic is configured to cause the pixels to be allocated into the pixel slots in an input sequence; pipelined processing logic configured to output, for each of the pixels, classification information associated with the pixel; and scheduling logic configured to control dispatches from the pixel slots to the pipelined processing logic, where the scheduling logic and pipelined processing logic are configured to act in concert to generate the classification information for the pixels in an output sequence that differs from and is independent of the input sequence, such that for a later pixel which is allocated into its pixel slot later than an earlier pixel is allocated into its pixel slot, the pipelined processing logic generates the classification information for the later pixel sooner than for the earlier pixel.

DETAILED DESCRIPTION

Figure 1:
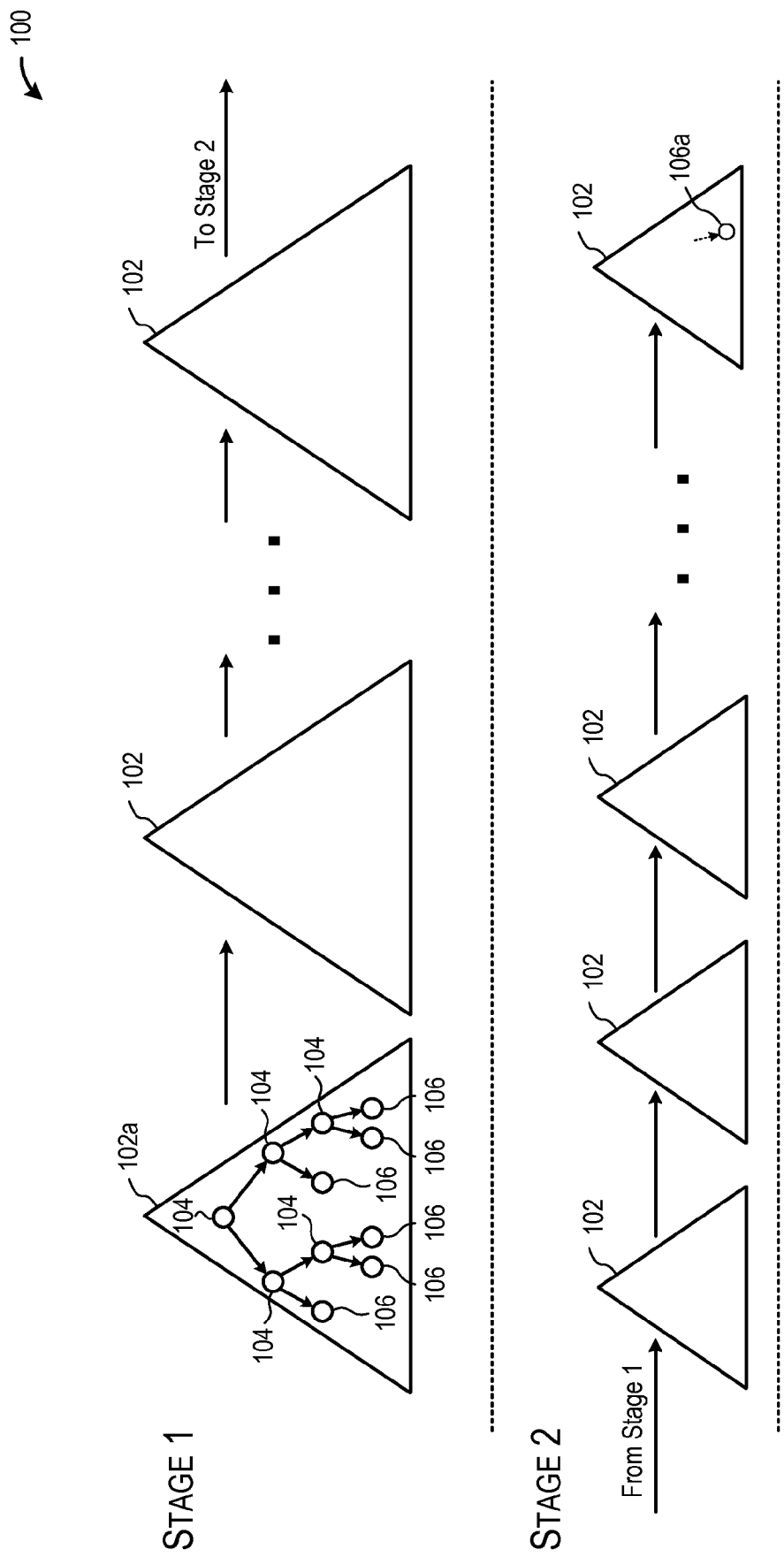
FIG. 1 shows an exemplary directed graph structure in accordance with an implementation of the present disclosure.

This description is directed to novel systems and methods for using pipelined processing logic to walk pixels through a directed graph structure. The directed graph structure is traversed in order to generate classification information for the pixels. Classification information may include, for example, whether the pixel has a certain feature or belongs to a certain class. In some cases, this is specified in terms of a probability that the pixel has the feature or belongs to the class.

In some embodiments, the directed graph structure processes a depth map in order to classify pixels. Retrieval logic allocates pixels into a pixel storage allocation including a plurality of pixel slots. A pixel slot stores various information about the pixel, for example addresses of data associated with the pixel, XY screen coordinates or other indices identifying the pixel, identification of the graph node being processed, results of directed graph processing operations, etc. Pixels are allocated pixel-by-pixel into the pixel slots in an input sequence. For example, pixels from a scan line might be serially placed one-by-one into available pixel slots. As will be described in more detail below, a pixel slot acts as a "home base" for a pixel while it is in flight through the directed graph structure. Once a pixel is classified, its slot is de-allocated and freed up for use by another in-bound pixel fetched by the retrieval logic.

Scheduling logic is functionally interposed between the pixel slots and the pipelined processing logic. The scheduling logic controls operation dispatches from the pixel slots to execution mechanisms in the pipelined processing logic. The pipelined processing logic operates to walk each pixel through the directed graph structure. The pixel slot operates as a home base/temporary storage location for information associated with the pixel, and this information can be changed, updated, etc. as the pipelined processing logic causes the pixel to make forward progress through the directed graph structure. As used herein, "forward progress" is a description of the pixel walking deeper and deeper through the directed graph structure toward a leaf node. As will be discussed in more detail below, forward progress may proceed in fits and starts (e.g., stalls or other long-latency events may occur that take time to resolve), such that in-flight pixels can leapfrog one another as they move downward through and deeper into the directed graph structure. This capacity for out-of-order, independent forward progress can provide many advantages, and allows the system to maximally leverage available processing resources, reduce latency and contention, and ensure that execution mechanisms do not stand idle.

The scheduling logic and the pipelined processing logic act in concert with one another to achieve machine-level parallelism and out-of-order processing for the pixels. In some examples this causes the classification information to be produced in an output sequence that differs from and is independent of the input sequence by which the classified pixels were allocated into their associated pixel slots. In one scenario, as mentioned above, this can cause pixel operations to leapfrog one another, permitting out-of-order classification output for the pixels. For example, classification information for a "later" pixel could be generated sooner than the classification information for an "earlier" pixel. "Earlier" and "later" refer to the order in which the pixels are allocated into their associated pixel slots in the pixel storage allocation. I.e., the "earlier" pixel is the pixel that is first allocated into the pixel storage allocation. More generally, the specific configurations of the scheduling logic and pipelined processing logic may permit pixels to independently make forward progress through the directed graph structure, regardless of whether or not the later pixel ultimately leapfrogs the earlier pixel at the output of the directed graph structure.

In one setting, the directed graph structure processes depth information for pixels to be classified (e.g., the input to the system is a depth map). Classification information in this setting may specify whether the pixel is associated with particular objects in a scene captured by a depth camera. In some examples, the classification information is a probability that the processed pixel belongs to a particular class, e.g., that it corresponds to a particular object. The innovations described herein may be specifically implemented in connection with body parts, e.g., in hand tracking applications to determine whether a pixel corresponds to a fingertip, wrist, forearm, etc.

Turning now to the figures, FIG. 1 depicts an exemplary directed graph structure 100. As depicted, the directed graph structure may include a plurality of decision trees 102. An example of an individual decision tree is shown at 102a in FIG. 2. Decision tree 102a includes decision nodes 104 and leaf nodes 106. The output of the operation at each decision node is a binary left-or-right decision about which branch to follow. Relative to the node being branched out from, the target node may be referred to as a child node.

The leaf nodes output information which is used to generate the ultimate classification information for the pixel. In typical implementations, multiple decision trees are traversed for a pixel, and the leaf node outputs from individual trees are used to calculate the ultimate classification output. Taking the example context of whether a pixel corresponds to the user's wrist, each leaf node output might specify a percentage probability, with the probabilities output from individual trees averaged to generate the final probability (e.g., "there is a 92% probability that this pixel corresponds to the user's wrist).

A wide variety of directed graph structure implementations may be used in accordance with the present description. In the specific example of FIG. 1, directed graph structure 100 includes multiple decision trees 102. The pixel under study is walked, via operation of scheduling logic and pipelined processing logic, through each decision tree 102. For fully processed pixels (in some cases, a pixel will exit the structure early), the ultimate classification information is generated in response to the pixel flowing through a final leaf node 106a.

Directed graph structure 100 may be implemented to move pixels through a particular predefined sequence of substructures (e.g., decision trees). The tree-to-tree arrows in the figure indicate such an arrangement, in which after being walked through a given tree 102, the pixel is then sent to a specified subsequent downstream tree. In other implementations, tree-to-tree flow may be dynamic, such that one tree for example can dynamically link to a different subsequent downstream tree depending on run-time conditions.

Also, as indicated, the directed graph structure may include multiple stages, with output from one stage feeding the input of another. A multi-stage arrangement may, for example, provide a temporal operation boundary during which other processing operations can be performed before moving on to the next stage. It will be appreciated that any number of trees may be implemented, in pre-determined or dynamic sequences, and in one or more stages having any desired number of trees. Still further, the directed graph structure as a whole and its substructures may be cyclic or acyclic. Still further, the described systems and methods might also be implemented in connection with decision nodes having more than two branches.

Figure 2:
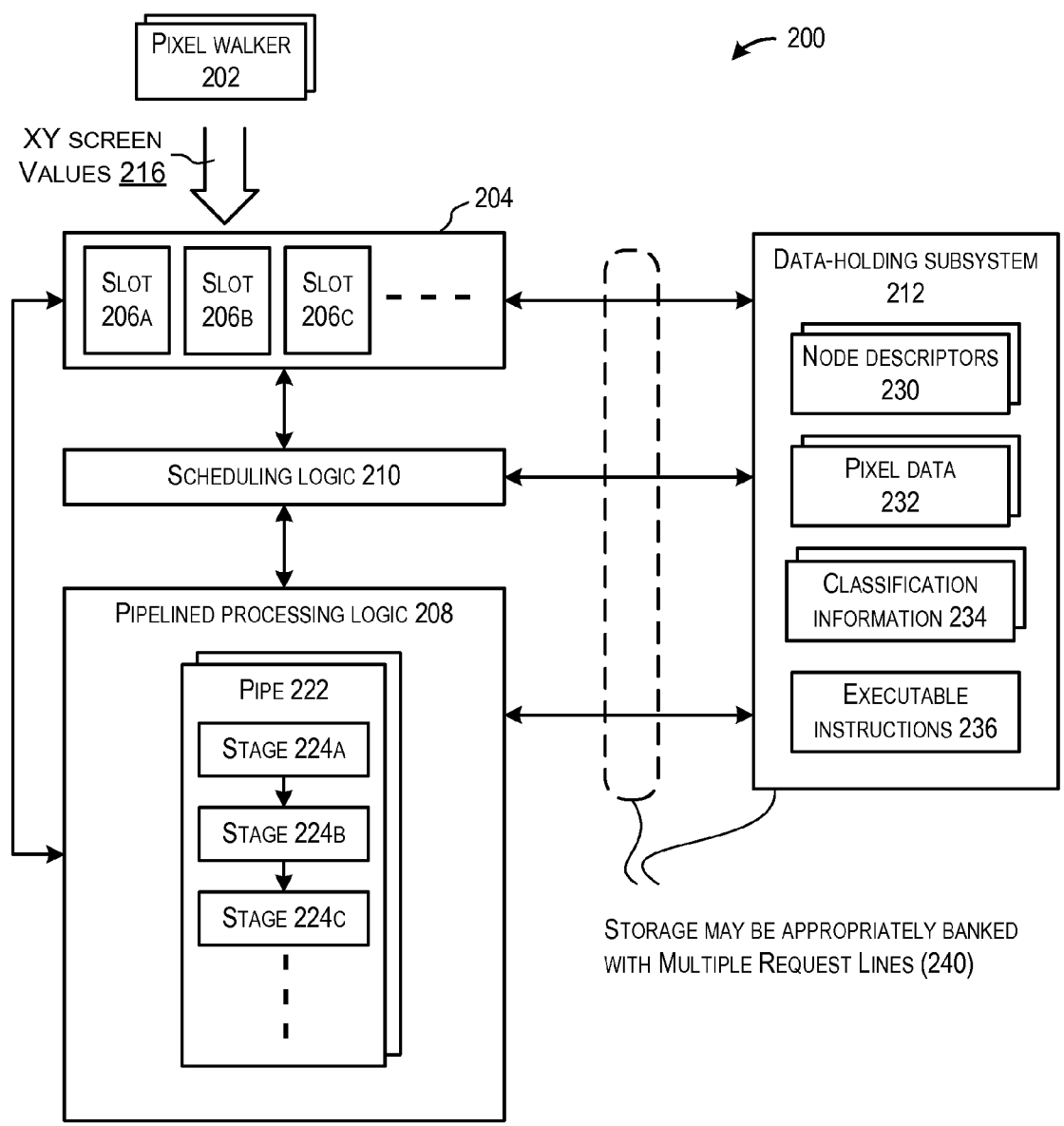
FIG. 2 schematically shows an exemplary system for classifying pixels in accordance with an implementation of the present disclosure.

Referring now to FIG. 2, the figure schematically depicts an exemplary system 200 for classifying pixels. Among other elements, system 200 includes retrieval logic in the form of one or more pixel walkers 202; a pixel storage allocation 204 including pixel slots 206a, 206b and 206c; pipelined processing logic 208; scheduling logic 210 functionally interposed between the pixel slots and the pipelined processing logic; and a data-holding subsystem 212. Although the pixel storage allocation is shown as being distinct from the data-holding subsystem, its pixel slots do hold data such that the pixel storage allocation and its pixel slots may co-reside in storage devices/locations with data in data-holding subsystem 212.

The retrieval logic allocates pixels into the pixel slots by providing the slots with data associated with the pixels to be classified. Again, each slot is associated individually with a pixel whose classification is pending. In the depicted example, the retrieval logic is one or more pixel walkers 202 that retrieve data from a depth map.

In the present example, the slots are allocated sequentially for individual pixels by feeding the XY screen values 216 for each pixel into the pixel slots. The pixel slots are filled/allocated serially, for example in the order that they are scanned out from the depth map, for example moving left to right in a particular row of the depth map. Again "earlier pixels" are pixels that are allocated into their slots before other pixels, which are referred to as "later pixels." In other words, any given pixel will be "earlier" relative to some pixels, and "later" relative to other pixels, save for the first and last pixels of a depth map. As will be described in more detail below, processing logic 208 may be deeply pipelined, and the system may implement a scheduling regime that: (i) reduces stalls and latency; (ii) efficiently leverages available execution mechanisms to avoid having resources stand idle; (iii) computes results out of order—e.g., classification can be generated for later pixels sooner than for earlier pixels—to maximize performance and throughput; (iv) minimizes the effects of memory contention; (v) allows pixels to independently make forward progress through a directed graph structure; (vi) etc.

Pipelined processing logic 208 may include one or more processing pipes 222, each having one or more processing stages 224. Any practicable number of pipes may be employed with any practicable number of stages. Moreover, any number of pixels slots may be employed. In one non-limiting example, the inventors have struck a desirable balance of considerations by using 12 pixel slots (12 pending pixels may be in-flight through a directed graph structure) and 3 multi-stage processing pipes having at least some redundant execution mechanisms (e.g., address calculators, load store units, etc.). But again, any number of slots, pipes and pip-estages may be employed.

Turning now to data-holding subsystem 212, it may include node descriptors 230 that describe aspects of a directed graph node, for example a decision tree. Such a descriptor may specify the specific operations to be performed at a node, the type of data inputs that are needed for the decision, etc.

Data-holding subsystem 212 typically will also include pixel data 232. This may include any relevant data for the pixels being classified. Examples include (i) XY screen coordinates, e.g. from a depth map, and potentially sensor data from a depth map; (ii) addresses of data associated with the pixel; (iii) calculation results from decision tree operations; (iv) preliminary classification information, e.g., probability output from a leaf node of a non-final decision tree; (v) etc. Some or all of this data may also be associated with a pixel slot that is allocated to the pixel during pending classification, in the sense that this data may reside in or be associated with the temporary home base (slot) allocated to the pixel while it is in-flight through the directed graph structure. Data-holding subsystem 212 also stores the classification information 234 for each pixel, e.g., the probability that a pixel from a depth map corresponds to a particular body part or other object/feature in a scene captured by a depth camera.

Figure 3:
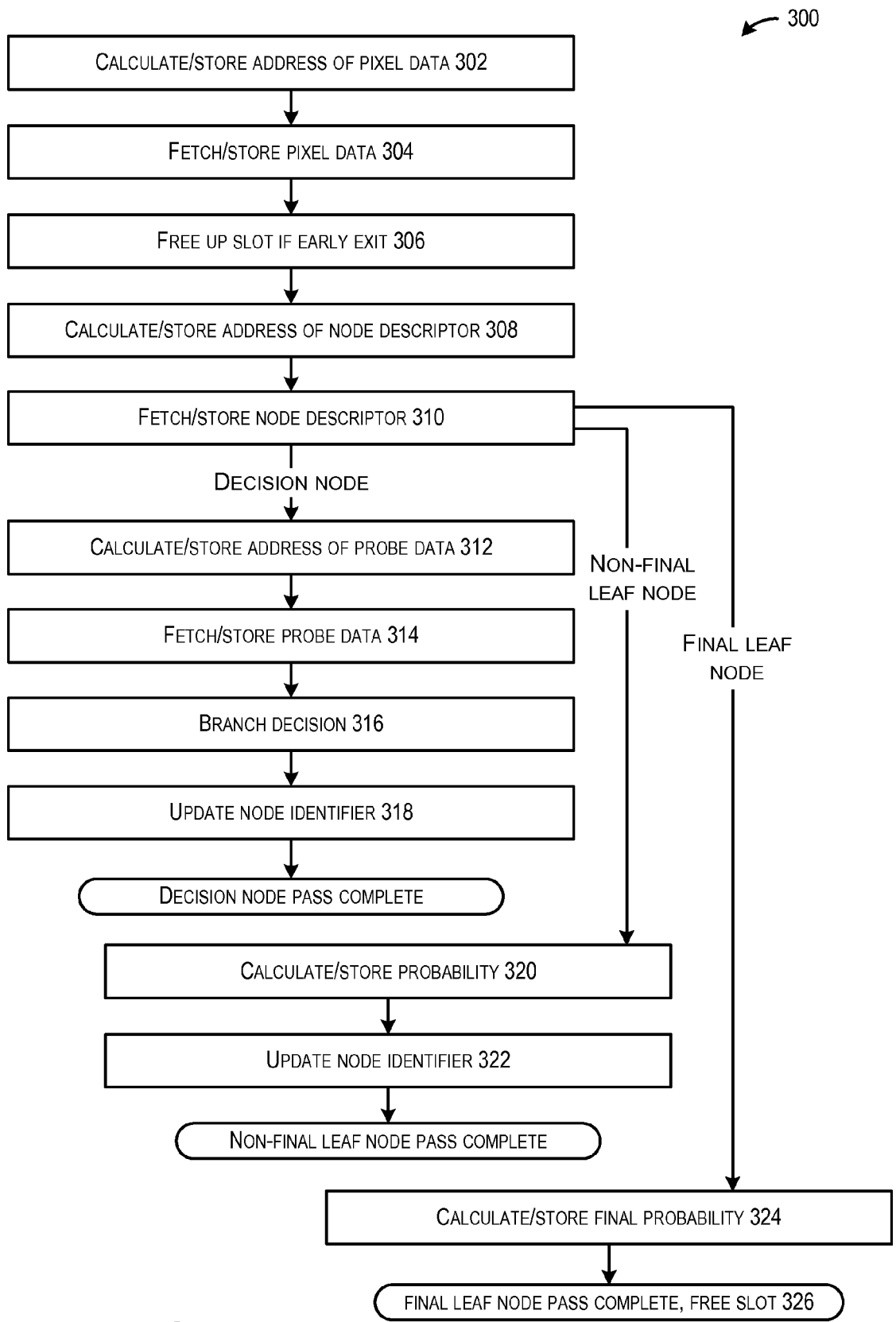
FIG. 3 shows a flowchart illustrating an exemplary method by which pixels may be classified in accordance with an implementation of the present disclosure.

Referring now to FIG. 3, the figure shows an exemplary method 300 by which pipelined processing logic 208 can walk pixels through a directed graph structure to classify pixels. It will be understood that this is a non-limiting example implementation: one or more steps may be omitted; steps may be performed in sequences other than that implied in the figure; one or more steps may be performed in parallel; additional steps not shown may be employed; etc. In many cases, much of the processing shown in the figure will be performed in hardware, though it will be appreciated that software and/or combinations of hardware and software may be employed. Software operations may be performed, for example, by executable instructions 236 stored in data-holding subsystem 212.

FIG. 3 contemplates a directed graph structure having multiple decision trees, and shows pipelined operations that occur for a processing pass through a tree node. It will be appreciated that this workflow will occur reiteratively for each processed node. Generally speaking, the slot stores an identifier/index that serves as a pointer/identifier identifying the specific node being processed. Once the processing workflow for that node is completed, the pointer identifier is updated to point to the target node (e.g., the child node that was branched to). The result of a processing pass for a decision node is a left-or-right branch to a downstream target node (child). For a non-final leaf node, the result of the processing pass is a probability that the pixel belongs to a class, and then workflow moves on to a subsequent decision tree. In the event of a final leaf node, the outputs from the final leaf node and all of the previously-traversed non-final leaf nodes are evaluated to generate the final classification information. In one example, the probability outputs from each leaf node are averaged to yield a final probability (e.g., that the pixel corresponds to one of the user's fingertips).

Generally speaking, the operations in FIG. 3 encompass, for a given decision tree node, calculating the addresses for needed data; fetching/storing the needed data; performing a calculation using the needed data as an input, e.g., whether to turn left or right out of a decision branch; storing results; and updating a pointer that identifies what node is to be processed next.

Figure 4:
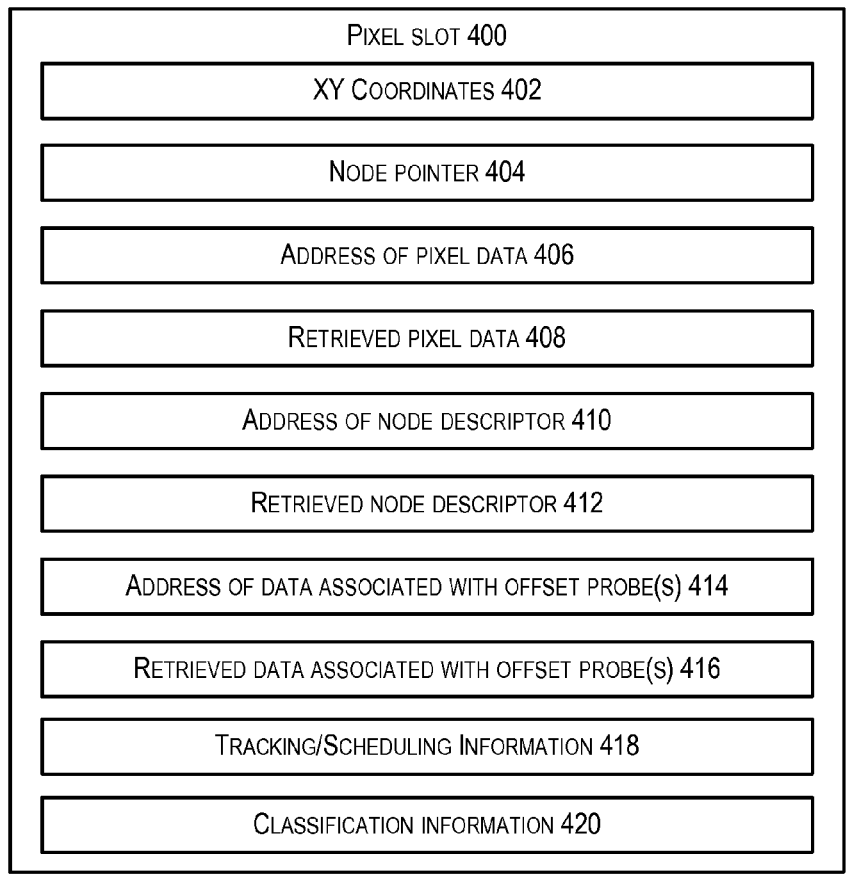
FIG. 4 schematically shows an example pixel slot in accordance with an implementation of the present disclosure.

FIG. 3 will also be discussed in conjunction with FIG. 4 which shows an example pixel slot 400 and its contents. At 404, the slot contains a node pointer which specifies the current node being processed. In one example, this pointer may indicate the stage in the directed graph structure, the particular tree, and the node within that tree, e.g., {stage1.tree4.node9}. At 302, method includes, for a pixel allocated into pixel slot 400 (FIG. 4), calculating and storing the address of one or more pieces of data associated with the pixel. In one example, the address is calculated from XY screen coordinates associated with the pixel that are fed by a pixel walker into slot 400 (coordinates shown at 402). Regardless of the method, the calculated address may be stored into the pixel slot at 406. Any type of data associated with a pixel may be fetched. In one category of implementation, as discussed throughout herein, pixel depth values may be fetched for use in the node calculations.

At 304, the method includes fetching and storing the pixel data. This may include, for example, using the address calculated at 302 to fetch relevant pixel data 232 from data-holding subsystem 212. In the specific implementation being discussed here, the data being fetched is depth information and/or reflectivity information associated with the pixel. Such information may be derived, directly or through intervening processing, from the sensor of a depth camera or other sensing mechanism that yields depth/reflectivity data. The retrieved information may be stored in pixel slot 400, as shown at 408.

In some implementations, there may be an early-exit from the processing flow, as shown at 306. For example, the system may have some knowledge of a room being scanned by a depth camera, for example that a back wall of the room in a capture volume is at a particular depth. If the depth information for the pixel is close to the depth of the back wall, it can be presumed that the pixel is not part of the user's body, eliminating the need for further classification processing. Any number of assessments can be used to determine early workflow exit. Another example would be analyzing motion information—if depth information has not changed for a certain duration, it might be presumed that such lack of motion means the pixel is not a body part. In any event, the early exit allows the slot 400 to be freed up (de-allocated), thereby allowing a new pixel to be allocated into the slot, in which case any stored data in the slot would be flushed out or allowed to be overwritten.

In the contemplated example, each node in the directed graph structure has a descriptor stored in data-holding subsystem 212 (descriptors 230). The descriptor may, for example, describe the type of operation to be performed at a decision node, such as edge detection, motion detection, depth comparison to neighboring pixels, comparison to one or more thresholds, application of a filter, etc. The descriptor may specify the type and/or location of operands or other data needed to make a calculation. Regardless, the descriptor will have an address (e.g., an address within data-holding subsystem 212) that may be used to retrieve the descriptor. As indicated at 308, the example method includes calculating and storing the node descriptor address. As indicated at 410 (FIG. 4) the descriptor address may be stored in slot 400. As mentioned above, in some implementations, pixel slot 400 includes a node pointer 402 that identifies the current node being processed. Referring back to FIG. 1, the pointer may include an index that identifies the current decision tree, and a sub-index that specifies the particular node on the tree. These pointers/indices may be used in the address calculation at 308. At 310, the method includes retrieving the node descriptor. The fetched descriptor may be stored in pixel slot 400, as shown at 412.

Figure 5:
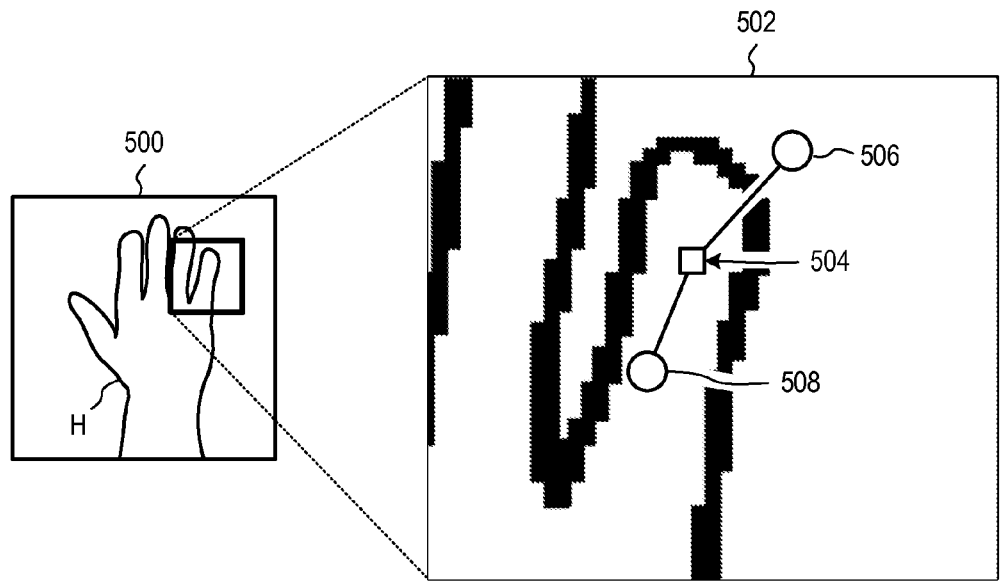
FIG. 5 schematically shows a depth map in accordance with an implementation of the present disclosure.

If the retrieved node is a decision node, as opposed to a leaf node, processing flow moves to steps 312, 314, 316 and 318, which will be described with additional reference to FIG. 5. FIG. 5 shows a depth map 500 of a user's hand H; a portion of the depth map is enlarged at 502. Pixel 504 is the pixel being classified. In one example, the classification operation entails comparing the pixel's depth value to the depth values of two neighboring pixels, referred to as offset probes, where "offset" means that the neighboring pixels are at some distance from the pixel being classified. The offset probes are shown in FIG. 5 at 506 and 508.

A wide range of implementations relating to offset probes may be used: any practicable number of probes may be sampled; sampling may be random or be performed via some non-random sampling method; any distance may be used from the pixel being studied; where multiple probes are used, the offset distances may be equal or different from probe to probe. It will be appreciated, however, that these are provided as non-limiting examples and that other probe approaches are within the scope of this disclosure.

Continuing with FIGS. 3 and 4, at 312, method 300 includes calculating and storing the address of data associated with the offset probes (e.g., depth data). The calculated address is stored in slot 400 at 414. At 314, the probe data is fetched and stored in slot 400 at 416. As discussed throughout, the described systems and methods can be put to beneficial use in the context of comparing depth/reflectivity data for the pixel being studied to similar data fetched for nearby point probes. But this is a non-limiting example. Any type of data associated with the pixel being studied and/or nearby pixels may be considered. More broadly, the description encompasses a very wide range of left-right decisions and criteria/operands/inputs for making those decisions. Many aspects of the described system are agnostic to the particulars of the branching decision, and instead are focused on the implementation of out-of-order processing; mitigation of memory contention; mitigation of long-latency effects; leveraging of deep pipelines and efficient use of available processing resources; machine-level parallelism; etc. In any event, the left-right branch decision occurs at 316, which in turn results in flow to a target node, which may be another decision node, a non-final leaf node or a final leaf node. As shown at 318, the node pointer is updated to the new target node, using the {stage.tree.node} formulation or other appropriate index/identifier. At this point the processing pass for the node is complete. The flowchart for the pixel of interest then begins again for the next node. Typically, steps 302, 304 and 306 are done only once per pixel, such that processing resumes with retrieval of the next node descriptor (steps 308 and 310).

As will be described in more detail below, the flow of FIG. 3 for a pixel does not necessarily progress/walk steadily along through the directed graph structure without interruption. Various stalls, hazards, and long-latency events may occur. For example, address calculations may be slow/delayed in certain situations, requested data may take a few cycles to return, the pipeline may attempt to retrieve nodes from a memory location being accessed by another pixel/slot. Any number of things might occur to interrupt processing. Accordingly, operations from a pixel slot may be "launched" by the scheduling logic into the pipelined processing logic repeatedly, and in-progress operations may be said to "retreat" back to the slot. The so-called retreat constitutes an interruption in processing, but the slots and scheduling logic act in concert to efficiently resume processing when issues are resolved. Typically, the slot will include some mechanism that acts as a placeholder/tracker that coordinates re-launch, including the timing of a re-launch—see tracking/scheduling information 418 in FIG. 4. In other words, the scheduling logic controls operation dispatch to the pipelined processing logic, and it works in concert with the pixel slots to perform this function, e.g., re-launching upon receipt of requested data. It will be appreciated that long-latency events are often associated with memory requests. Thus, in addition to the efficiencies and performance benefits gained via intelligent scheduling, long-latency memory access events may be mitigated somewhat by banking memory and providing multiple request lines—see 240 of FIG. 2.

In the event that the node is a non-final leaf node, workflow proceeds to steps 320 and 322. At 320, the method includes calculating/storing probability information. As previously indicated, one example implementation involves each non-final leaf node providing a probability. For example, taking non-final leaf nodes A, B and C, suppose that non-final leaf node A specifies a 95% probability that the pixel being studied corresponds to the user's forearm; non-final leaf node B specifies a 98% probability that the pixel being studied corresponds to the user's forearm; and non-final leaf node C specifies a 78% probability that the pixel being studied corresponds to the user's forearm. In such a case, these three results may be averaged upon reaching a final leaf node, in order to generate a final classification output that the pixel being studied is 90.33% likely to be a forearm. At 322, the node pointer is updated to the new target node, which in this scenario (outflow from a non-final leaf node) typically would target the root decision node of a next decision tree in the directed graph structure. Processing for the pixel being studied would then proceed to this next root node. As indicated above, steps 302, 304 and 306 typically are done only once per pixel, such that continued processing would begin with retrieval of the next root node (steps 308 and 310).

In the event that the node is final leaf node, processing flows from 310 to 324. At 324, the general processing is to generate a final classification output, e.g., the probability that the pixel has a certain feature or belongs to a certain category/class. In the implementation described here, the final output is the probability that the pixel corresponds to a body part of the user (forearm, wrist, fingertip, etc.). This probability can be stored in data-holding subsystem 212 as classification information 234. At this point, the pixel has been classified, which allows its pixel slot to be de-allocated (step 326), which in turn allows the slot to be in-filled with another pixel (e.g., the pixel walker can feed XY coordinates of the new pixel into the slot). Prior to de-allocation, the classification information that is produced via traversing of leaf nodes may be stored as classification information 420 in slot 400.

As indicated above, walking a pixel through a directed graph structure may be interrupted from time to time by stalls, hazards, long-latency events, memory contention/conflict, etc. In such a case, processing flow may "retreat" back to the home base pixel slot, and a re-launch may occur a few cycles later after the issue has been resolved (e.g., requested data has returned). The pixel slot typically has some placeholder/tracking mechanism accessible by the scheduling logic that allows the scheduling logic to intelligently control re-launch of the pixel to an appropriate mechanism of the pipelined processing logic. It should be noted that multiple processing pipes may be employed, and re-launch may be controlled so that operations are dispatched to a specific pipe. The specific pipe may be the pipe in which the stall occurred, or it may be another pipe that can provide the same functionality that was in progress as the stall occurred. In this regard, the scheduling logic typically will have some mechanism that allows it to maximally take advantage of available execution resources, so that those resources are optimally used and not allowed to stand idle when they can be put to good use.

The concerted operation of the pixel slots, scheduling logic and pipelined processing logic provides a number of benefits. First, as noted elsewhere, classification may occur for earlier pixels before later pixels (i.e., the output sequence may be different than the input sequence in which pixels are allocated into the slots). For example, assuming a temporal input sequence of pixels P0, P1, P2, P3, P4, the output sequence could be P3, P0, P2, P4, P1. Any order is possible, and the ultimate output sequence typically will be a function of the specific issues occurring while the respective pixels are being walked through the directed graph structure (stalls, duration and number of long-latency events, memory conflicts, etc.). Another way of understanding this dynamic is that the pixels independently make forward progress through the directed graph structure.

Figure 6:
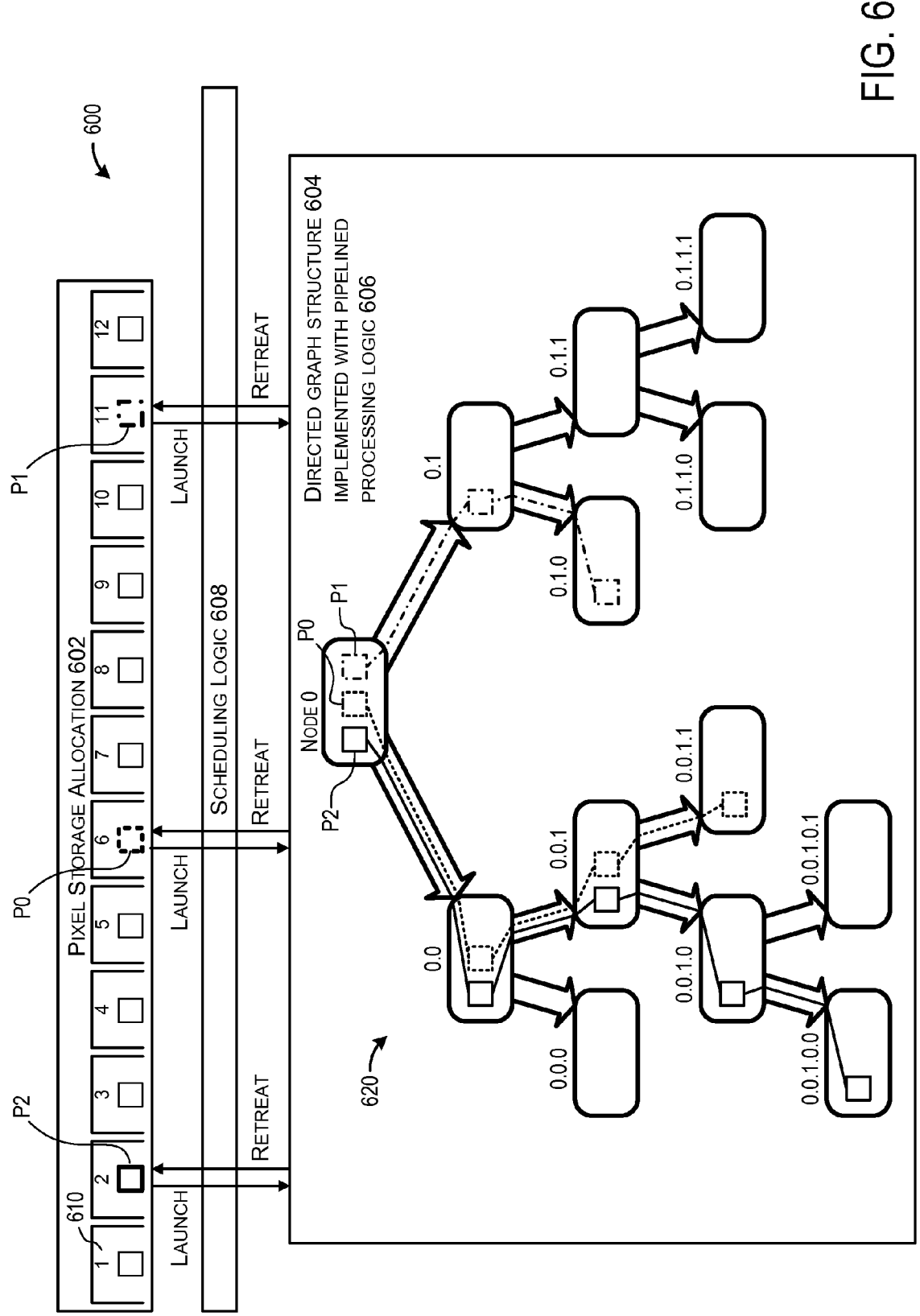
FIG. 6 shows a pixel classification system in accordance with an implementation of the present disclosure.

FIG. 6 provides an example, in connection with pixel classification system 600, of three pixels held in pixel storage allocation 602 being walked through a directed graph structure 604, which is implemented in hardware by pipelined processing logic 606. Pixel storage allocation 602 includes pixel slots 610, identified here as slots 1 through 12. Though twelve slots are depicted, any practicable number may be employed. In this example, twelve slots allow twelve pixels to be simultaneously in flight through directed graph structure 604. Scheduling logic 608 is interposed functionally between the pixel slots and pipelined processing logic 606. The scheduling logic operates as described elsewhere to: (i) control operation dispatch—also referred to as "launch"—into the directed graph structure and its implemented pipelined processing logic; (ii) intelligently dispatch pixels and pixel data to the available processing resources; (iii) monitor the timing of re-launch operations, e.g., to re-launch only when requested data becomes available in the pixel slot; (iv) facilitate the clearing of stalls by flushing in-progress operations that are stalling, controlling retreat back to the slot, and tracking when the stall is resolved so that re-launch is timed appropriately.

In this example, each pixel slot is filled with a pixel whose classification is pending; in other words there are twelve pixels in-flight and making independent forward progress through directed graph structure 604 to eventually culminate in a final classification output. For purpose of clarity and illustration, operations will be described for only three of the pixels: P0, P1 and P2. The 0/1/2 designations refer to the input sequence in which they were allocated into their slots: P0 is the earliest pixel, P2 is the latest pixel, and P1 was allocated in time between pixels P0 and P2. Again as previously described, the timing of the ultimate outputs for these pixels can occur in any order. Processing is shown for only one decision tree 620. Each pixel flows through the tree, potentially with occasional interruption, en route to a leaf node. The root decision node is designated as "0". Each child note in the tree is designate with reference to its parent node and the branching direction by which it was reached. Left turns are designated with a "0" and right turns with a "1". In other words, the left target from the root node [0] is [0.0] and the right target is [0.1]. The left target of [0.0] is [0.0.0] and its right target is [0.0.1], and so on. Pixel P0 flows through [0]>[0.0]>[0.0.1]>[0.0.1.0]>[0.0.1.0.0] (the leaf node). Pixel P1 flows through [0]>[0.0]>[0.0.1]>[0.0.1.1] (leaf node). Pixel P2 flows through >[0.1]>[0.1.0] (leaf node).

As can be seen, all three pixels to some extent share a common pathway. First, all three pixels start at root node [0]. Pixel P1 then diverges from the other two to node [0.1]. Pixels P2 and P0 commonly flow through [0], [0.0] and [0.0.1], at which point they diverge to different target child nodes.

Although pixels P2 and P0 walk part of the same pathway, they can leapfrog each other even along this common path. For example, pixel P0 may start first at node [0]. We can then well imagine a potential stall when P0 is processing at [0.0]. Perhaps P0 is requesting a node descriptor that is currently being accessed by another slot/pixel. Perhaps at [0.0] there is some latency associated with an address calculation. Perhaps at [0.0] there is memory contention as point probes are fetched. Any number of interruptions is possible. In the event of such an interruption, P0 would retreat to its slot, with pixel P2 then potentially flowing through [0]>[0.0]>[0.0.1] before P0 was re-launched (e.g., after requested data has been returned). This independent, out-of-order, forward progress provides great flexibility, efficient use of processing resources, minimization of performance penalties associated with memory contention, etc.

The use of twelve pixel slots allows twelve pixels to be simultaneously in flight through directed graph structure 606, and the pipelined processing logic 604 and scheduling logic 608 are configured so that each pixel can independently make forward progress through the directed graph structure—pixels may leapfrog past one another; the ultimate writeout sequence is independent of the input sequence in which pixels are allocated into their pixel slots; later pixels can be ultimately classified sooner than earlier pixels, etc.

Scheduling logic 608 controls operation dispatch from the pixel slots to execution mechanisms of pipelined processing 606. As indicated, for any given slot, operations may "launch" into the pipelined processing logic and may retreat from the pipeline. It will be understood that these terms are conceptual, and represent activity occurring with respect to the slot—i.e., a launch indicates commencement of operation in the pipeline for the allocated pixel; a retreat indicates that operations have stopped, for example in the event of a stall or other long-latency event.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
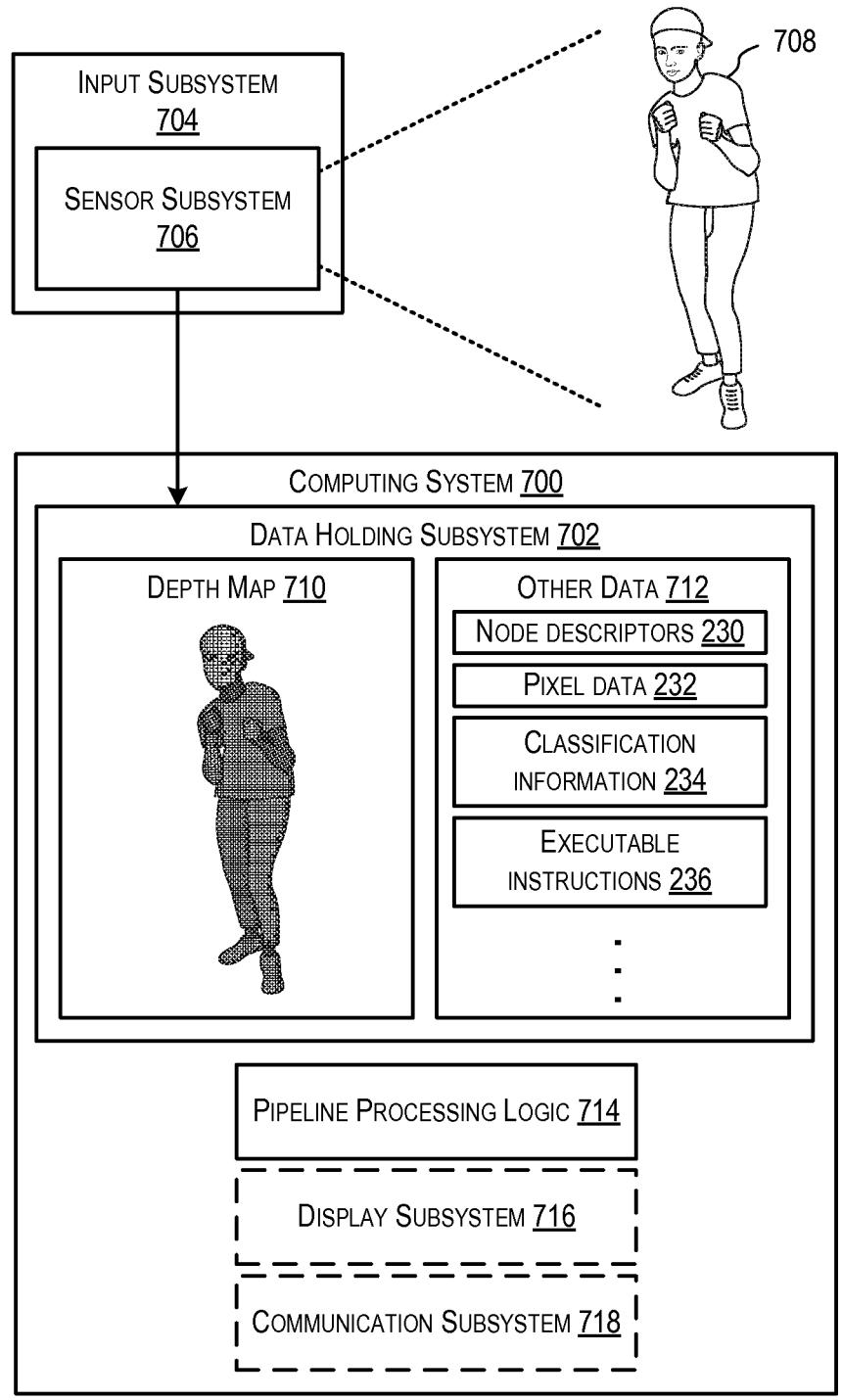
FIG. 7 shows a block diagram of a computing system in accordance with an implementation of the present disclosure.

FIG. 7 schematically shows a non-limiting implementation of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. For example, computing system 700 may be a Microsoft Kinect.

Computing system 700 includes a data-holding subsystem 702 and pipeline processing logic 714. Computing system 700 may optionally include a display subsystem 716, communication subsystem 718, input subsystem 704, and/or other components not shown in FIG. 7.

Data-holding subsystem 702 includes one or more physical devices configured to hold instructions executable by the pipeline processing logic to implement the methods and processes described herein. When such methods and processes are implemented, the state of data-holding subsystem 702 may be transformed—e.g., to hold different data. For example, data-holding subsystem 702 may be configured to hold depth map 710 and/or other data 712, where the other data includes node descriptors 230, pixel data 232, classification information 234, executable instructions 236 and any other suitable data. Additionally, data-holding subsystem 702 may include pixel slots configured to hold data such that the pixel storage allocation and its pixel slots may co-reside in storage devices/locations with data in data-holding subsystem 702.

Data-holding subsystem 702 may include removable and/or built-in devices. Data-holding subsystem 702 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Data-holding subsystem 702 may include volatile, nonvolatile, dynamic, static, read/write, read-only, random-access, sequential-access, location-addressable, file-addressable, and/or content-addressable devices. It will be appreciated that data-holding subsystem 702 includes one or more physical devices. However, aspects of the instructions described herein alternatively may be propagated by a communication medium (e.g., an electromagnetic signal, an optical signal, etc.) that is not held by a physical device for a finite duration.

Input subsystem 704 may comprise or interface with sensor subsystem 706. Sensor subsystem 706 may be configured to capture subject 708 as depth information in the form of depth map 710, where the depth map is sent to and stored in data-holding subsystem 702. Additionally or alternatively, input subsystem 704 may include one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

Pipeline processing logic 714 includes one or more physical devices configured to execute instructions. For example, the pipeline processing logic may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Pipeline processing logic 714 may include one or more processors configured to execute software instructions. Additionally or alternatively, the pipeline processing logic may include one or more hardware or firmware logic machines configured to execute hardware or firmware instructions. Processors of the pipeline processing logic may be single-core or multi-core, and the instructions executed thereon may be configured for sequential, parallel, and/or distributed processing. Individual components of the pipeline processing logic optionally may be distributed among two or more separate devices, which may be remotely located and/or configured for coordinated processing. Aspects of the pipeline processing logic may be virtualized and executed by remotely accessible, networked computing devices configured in a cloud-computing configuration.

Aspects of data-holding subsystem 702 and pipeline processing logic 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via pipeline processing logic 714 executing instructions held by data-holding subsystem 702. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 716 may be used to present a visual representation of data held by data-holding subsystem 702. This visual representation may take the form of a graphical user interface (GUI). As the herein described methods and processes change the data held by the data-holding subsystem, and thus transform the state of the storage machine, the state of display subsystem 716 may likewise be transformed to visually represent changes in the underlying data. Display subsystem 716 may include one or more display devices utilizing virtually any type of technology. Such display devices may be combined with data-holding subsystem 702 and/or pipeline processing logic 714 in a shared enclosure, or such display devices may be peripheral display devices.

When included, communication subsystem 718 may be configured to communicatively couple computing system 700 with one or more other computing devices. Communication subsystem 718 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

The examples herein primarily refer to binary decision trees in which node operations result in a "left or right" decision. It will be appreciated however, that the present systems and methods may be employed in connection with other types of node outcomes. For example, the classifier could jump to arbitrary nodes based upon TRUE/FALSE offsets embedded in a node. For example, if a decision evaluated as TRUE, (next-node-offset=current-node-offset+node-TRUE-offset).

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system for classifying pixels, comprising:
   retrieval logic;
   a pixel storage allocation hardware including a plurality of pixel slots,
   each pixel slot being associated individually with a pixel, where the retrieval logic is configured to cause the pixels to be allocated into the pixel slots in an input sequence;
   pipelined processing hardware configured to output, for each of the pixels, classification information associated with the pixel; and
   scheduling hardware configured to control dispatches from the pixel slots to the pipelined processing hardware, where the scheduling hardware and pipelined processing hardware are configured to act in concert to generate the classification information for the pixels in an output sequence that differs from and is independent of the input sequence, such that for a later pixel which is allocated into its pixel slot later than an earner pixel is allocated into its pixel slot, the pipelined processing hardware generates the classification information for the later pixel sooner than for the earlier pixel.

2. The system of claim 1, where the pipelined processing hardware includes a processing pipe, and where the scheduling hardware and processing pipe are configured such that, in the event that the earner pixel stalls in the processing pipe, the stall is cleared and the scheduling hardware dispatches the later pixel to the processing pipe prior to re-dispatching the earner pixel to the processing pipe.

3. The system of claim 2, where in the event that the earlier pixel stalls in the processing pipe, its pixel slot stores tracking information that is used to control subsequent processing of the earlier pixel in the processing pipe.

4. The system of claim 3, where the tracking information tracks whether a storage request associated with processing the earlier pixel has been fulfilled, and where the scheduling hardware is configured to re-dispatch the earlier pixel to the processing pipe upon such fulfillment of the storage request.

5. The system of claim 3, where tracking information is used to control when the earlier pixel is re-dispatched to the processing pipe.

6. The system of claim 1, where:
    (i) the pipelined processing hardware is configured to walk the earlier pixel and the later pixel through a directed graph structure in order to output the classification information for the earner pixel and the later pixel, the classification information being generated upon processing a final leaf node of the directed graph structure; and
    (ii) the scheduling hardware is configured to control dispatches to the pipelined processing hardware for the earner pixel and the later pixel, so that the earlier pixel and the later pixel independently make forward progress through the directed graph structure, thereby permitting the earner pixel to sometimes be ahead of the later pixel and sometimes be behind the later pixel.

7. The system of claim 6, where each of the pixel slots is configured, in response to classification information for its associated pixel being output by the pipelined processing hardware, to be freed and then receive a new pixel to be classified.

8. The system of claim 1, where the pipelined processing hardware is configured to cause each pixel to be processed through a directed graph structure whose ultimate leaf node outputs the classification information for the pixel.

9. The system of claim 8, where the classification information is a probability that the pixel belongs to a class.

10. The system of claim 8, where the classification information is a probability that the pixel is associated with a particular body part.

11. The system of claim 8, where the directed graph structure is configured to act upon depth data associated with the pixels in order to generate the classification information.

12. The system of claim 8, where the directed graph structure includes nodes that are configured, for the pixel being classified, to compare depth data of such pixel with depth data of offset pixels.

13. A system for classifying pixels, comprising:
    retrieval logic;
    a pixel storage allocation hardware including a plurality of pixel slots, each pixel slot being associated individually with a pixel from a depth map, where the retrieval logic is configured to cause the pixels to be allocated into the pixel slots to in an input sequence;
    pipelined processing hardware configured to output, for each of the pixels, classification information associated with the pixel, where the classification information is a probability that the pixel belongs to a class and is output as a result of the pipelined processing hardware walking the pixel through a directed graph structure;
    scheduling hardware configured to control dispatches from the pixel slots to the pipelined processing hardware, where the scheduling hardware and pipelined processing hardware are configured to act in concert to generate the classification information for the pixels in an output sequence that differs from and is independent of the input sequence, such that for a later which is allocated into its pixel slot later than an earlier pixel is allocated into its pixel slot, the pipelined processing hardware is configured to generate the classification information for the later pixel sooner than for the earlier pixel, and where the scheduling hardware is configured to control dispatches to the pipelined processing hardware so that the earlier pixel and the later pixel independently make forward progress through the directed graph structure, thereby permitting the earner pixel to sometimes be ahead of the later pixel and sometimes be behind the later pixel.

14. The system of claim 13, where the pipelined processing hardware includes a processing pipe, and where the scheduling hardware and processing pipe are configured such that, in the event that the earlier pixel stalls in the processing pipe, the stall is cleared and the scheduling hardware dispatches the later pixel to the processing pipe prior to re-dispatching the earlier pixel to the processing pipe.

15. The system of claim 13, where each of the pixel slots is configured, in response to classification information for its associated pixel being output by the pipelined processing hardware, to be freed and then receive a new pixel to be classified.

16. The system of claim 13, where the directed graph structure is configured to act upon depth data associated with the pixels in order to generate the classification information.

17. A method for classifying pixels, comprising:
    allocating a plurality of pixels into a plurality of pixel slots of a pixel storage allocation hardware, such that each pixel is associated individually with one of the pixel slots, the pixels including an earlier pixel and a later pixel, the earlier pixel being allocated into its pixel slot earlier than the later pixel;
    walking, via operation of pipelined processing hardware, each of the pixels through a directed graph structure; as a result of such walking, outputting classification information for each pixel; and
    controlling, with scheduling hardware, dispatches from the pixel slots to the pipelined processing hardware so that the earlier pixel and the later pixel independently make forward progress through the directed graph structure, thereby permitting the earner pixel to sometimes be ahead of the later pixel and sometimes be behind the later pixel.

18. The method of claim 17, where walking the pixels through the directed graph structure causes the pixels to be classified based on depth values associated with the pixels.

19. The method of claim 17, where the pixel slots include tracking information, where the tracking information tracks whether a storage request associated with processing the earner pixel has been fulfilled, and where the scheduling hardware is configured to re-dispatch the earlier pixel upon such fulfillment of the storage request.

20. The method of claim 17, further comprising, in the event that the earner pixel stalls in the pipelined processing hardware, clearing the stall and dispatching the later pixel to the pipelined processing hardware prior to re-dispatching the earlier pixel to the pipelined processing hardware.

* * * * *